(12) United States Patent
Lee et al.

(10) Patent No.: US 11,973,695 B2
(45) Date of Patent: Apr. 30, 2024

(54) INFORMATION PROCESSING APPARATUS AND INFORMATION PROCESSING METHOD

(71) Applicants: TOYOTA JIDOSHA KABUSHIKI KAISHA, Toyota (JP); Korea Advanced Institute of Science and Technology, Daejeon (KR)

(72) Inventors: Chunghan Lee, Chiyoda-ku (JP); Jinwoo Park, Daejeon (KR); Byoungkwon Choi, Daejeon (KR); Dongsu Han, Daejeon (KR)

(73) Assignees: TOYOTA JIDOSHA KABUSHIKI KAISHA, Toyota (JP); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 18/056,785

(22) Filed: Nov. 18, 2022

(65) Prior Publication Data
US 2023/0171205 A1 Jun. 1, 2023

(30) Foreign Application Priority Data

Nov. 26, 2021 (JP) .................................. 2021-191864

(51) Int. Cl.
*H04L 47/80* (2022.01)
*H04L 47/70* (2022.01)
*H04L 47/83* (2022.01)

(52) U.S. Cl.
CPC .......... *H04L 47/805* (2013.01); *H04L 47/823* (2013.01); *H04L 47/83* (2022.05)

(58) Field of Classification Search
CPC ..... H04L 47/805; H04L 47/823; H04L 47/83; H04L 67/10; H04L 41/5045
See application file for complete search history.

(56) References Cited

U.S. PATENT DOCUMENTS

| 11,354,580 B2 | 6/2022 | Miyagi et al. |
| 2018/0247221 A1 | 8/2018 | Park et al. |

(Continued)

OTHER PUBLICATIONS

"Horizontal Pod Autoscaling", Kubernetes, URL: https://kubernetes.io/docs/tasks/run-application/horizontal-pod-autoscale/, Accessed on Nov. 7, 2022, 9 pages.

(Continued)

*Primary Examiner* — Jungwon Chang
(74) *Attorney, Agent, or Firm* — Oblon, McClelland, Maier & Neustadt, L.L.P.

(57) ABSTRACT

An information processing apparatus comprises a controller. The controller is configured to execute: acquiring a plurality of datasets, each of the datasets being configured with a combination of training data and a correct answer label; and implementing machine learning of an estimation model using the acquired plurality of datasets, wherein the training data includes workload information about an application constructed based on a microservice architecture and resource use information about resources used for each of components included in the application, in a learning target environment, the correct answer label is configured to show a true value of quality of service of the application, and the machine learning comprises training the estimation model such that, for each of the datasets, an estimated value of the quality of service calculated with the estimation model based on the training data corresponds to the true value shown by the correct answer label.

12 Claims, 10 Drawing Sheets

(56) References Cited

U.S. PATENT DOCUMENTS

| | | | |
|---|---|---|---|
| 2020/0004600 A1* | 1/2020 | Acker | H04L 67/10 |
| 2020/0183743 A1* | 6/2020 | Moore | G06F 9/5061 |
| 2021/0028991 A1* | 1/2021 | Nataraj | H04L 41/5045 |
| 2021/0044499 A1 | 2/2021 | Snyder et al. | |
| 2021/0352516 A1 | 11/2021 | Sawabe et al. | |
| 2022/0038902 A1* | 2/2022 | Mueck | H04W 52/42 |
| 2022/0100578 A1* | 3/2022 | Moreira Martins | G06F 9/5083 |
| 2022/0188575 A1 | 6/2022 | Zhu et al. | |
| 2023/0110012 A1* | 4/2023 | Jasleen | G06F 11/3051 |
| | | | 718/104 |
| 2024/0037451 A1 | 2/2024 | Sone et al. | |

OTHER PUBLICATIONS

U.S. Office Action issued Mar. 20, 2024, in co-pending U.S. Appl. No. 18/454,477, citing documents 1-6, Examiner Jungwon Chang.

* cited by examiner

INFORMATION PROCESSING APPARATUS AND INFORMATION PROCESSING METHOD

CROSS REFERENCE TO THE RELATED APPLICATION

This application claims the benefit of Japanese Patent Application No. 2021-191864, filed on Nov. 26, 2021, which is hereby incorporated by reference herein in its entirety.

BACKGROUND

Technical Field

The present disclosure relates to a technology for optimizing the volume of resources used for an application constructed based on a microservice architecture.

Description of the Related Art

Recently, the number of examples of adopting a microservice architecture in development and operation of an application system has been increasing. A microservice architecture is a method of implementing each element constituting a service as an independent component called a microservice.

In "Horizontal Pod AutoscaleriKubernetes", (URL: https://kubernetes.io/docs/tasks/run-application/horizontal-pod-autoscale/), a method is proposed in which a target value is provided for a use situation of resources (for example, a processor/memory use rate) of each component, and the volume of resources (specifically, the number of pods to develop containers) is adjusted such that the use situation approaches the target value.

SUMMARY

An object of the present disclosure is to provide a technology capable of optimizing the volume of resources to be used, according to a target of the quality of service of an application constructed based on a microservice architecture.

The present disclosure in its one aspect provides an information processing apparatus comprising a controller comprising at least one processor, the controller being configured to execute: acquiring a plurality of datasets, each of the datasets being configured with a combination of training data and a correct answer label; and implementing machine learning of an estimation model using the acquired plurality of datasets, wherein the training data includes workload information about an application constructed based on a microservice architecture and resource use information about resources used for each of components included in the application, in a learning target environment, the correct answer label is configured to show a true value of quality of service of the application, and the machine learning comprises training the estimation model such that, for each of the datasets, an estimated value of the quality of service calculated with the estimation model based on the training data corresponds to the true value shown by the correct answer label.

The present disclosure in its another aspect provides an information processing apparatus comprising a controller comprising at least one processor, the controller being configured to execute: acquiring target data that includes workload information about an application constructed based on a microservice architecture and resource use information about resources used for each of components included in the application in an estimation target environment; calculating an estimated value of quality of service of the application based on the acquired target data by using a trained estimation model; if the calculated estimated value of the quality of service does not properly satisfy a target, optimizing a volume of the resources relative to the target, based on the estimated value of the quality of service calculated with the trained estimation model by a predetermined optimization method; and adjusting the volume of the resources used for each of the components according to a result of the optimization.

The present disclosure in its another aspect provides an information processing method executed by a computer, the information processing method comprising: acquiring target data that includes workload information about an application constructed based on a microservice architecture and resource use information about resources used for each of components included in the application in an estimation target environment; calculating an estimated value of quality of service of the application based on the acquired target data by using a trained estimation model; if the calculated estimated value of the quality of service does not properly satisfy a target, optimizing a volume of the resources relative to the target, based on the estimated value of the quality of service calculated with the trained estimation model by a predetermined optimization method; and adjusting the volume of the resources used for each of the components according to a result of the optimization.

According to the present disclosure, it is possible to optimize the volume of resources to be used, according to a target of the quality of service of an application constructed based on a microservice architecture.

DESCRIPTION OF THE EMBODIMENTS

Figure 1A:
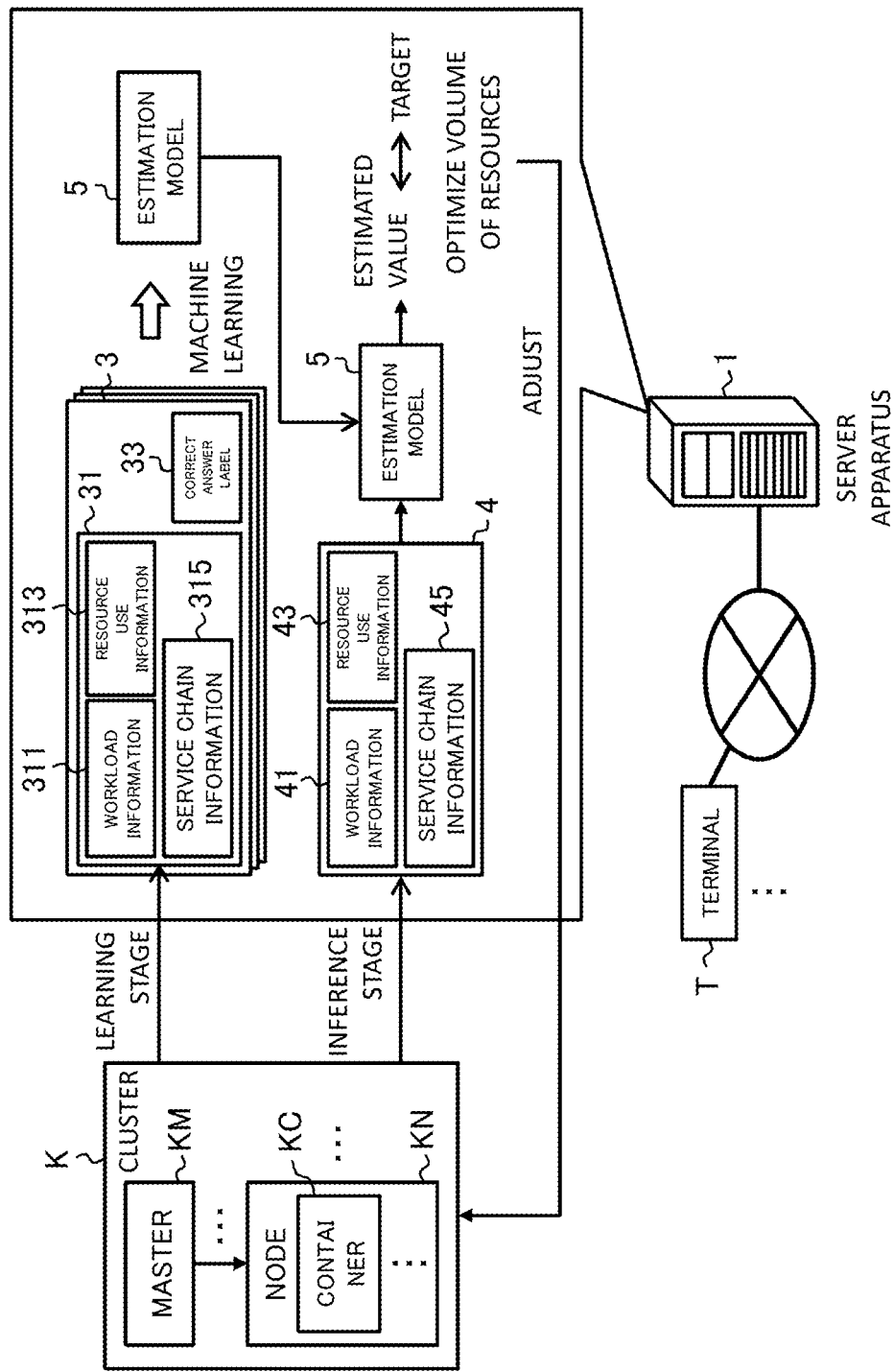
FIG. 1A schematically illustrates an example of a scene in which the present disclosure is applied.

According to the method proposed in "Horizontal Pod Autoscaler|Kubernetes", (URL: https://kubernetes.io/docs/tasks/run-application/horizontal-pod-autoscale/), the quality of service of the whole application can be ensured by performing adjustment such that the volume of resources used for each of components (microservices) approaches a target value. For example, by increasing the number of pods used for each component, the quality of service of the whole application can be improved.

However, as the number of components increases, and the configuration of the application is more and more complicated, how each component influences the quality of service of the whole application is unknown. Further, each component can have a different characteristic curve with regard to the quality of service of the application. That is, while such components that can improve the quality of service by assignment of a small volume of resources can exist, such components that cannot improve the quality of service unless many resources are assigned can exist.

Therefore, it is difficult to optimally set a target value for each component such that the quality of service of the whole application properly satisfies a target. Further, if target values are uniformly decided, useless resources may be deployed for some components. That is, it is difficult for a conventional method to optimize the volume of resources used for each component according to a target of the quality of service of the whole application constructed based on a microservice architecture.

In comparison, an information processing apparatus according to a first aspect of the present disclosure includes a controller, the controller being configured to execute: acquiring a plurality of datasets, each of the datasets being configured with a combination of training data and a correct answer label; and implementing machine learning of an estimation model using the acquired plurality of datasets. The training data includes workload information about an application constructed based on a microservice architecture and resource use information about resources used for each of components included in the application in a learning target environment. The correct answer label is configured to show a true value of quality of service of the application. The machine learning includes training the estimation model such that, for each of the datasets, an estimated value of the quality of service calculated with the estimation model based on the training data corresponds to the true value shown by the correct answer label.

An information processing apparatus according to a second aspect of the present disclosure includes a controller. The controller is configured to execute: acquiring target data that includes workload information about an application constructed based on a microservice architecture and resource use information about resources used for each of components included in the application in an estimation target environment; calculating an estimated value of quality of service of the application based on the acquired target data by using a trained estimation model; if the calculated estimated value of the quality of service does not properly satisfy a target, optimizing a volume of the resources relative to the target, based on the estimated value of the quality of service calculated with the trained estimation model by a predetermined optimization method; and adjusting the volume of the resources used for each of the components according to a result of the optimization.

According to the information processing apparatus according to the first aspect of the present disclosure, it is possible to generate a trained estimation model that has acquired an ability of estimating the quality of service of an application from workload information and resource use information about resources. According to this trained estimation model, it is possible to, when information regarding a workload state and deployment of resources for each component are given, estimate the quality of service of the whole application under the conditions. That is, if this trained estimation model is used, it is possible to predict correspondence relationships between deployment of resources for each component and the quality of service of the application according to the state of the workload. Therefore, by giving a target of the quality of service, an optimal volume of resources for each component according to the target can be derived by any optimization method.

Therefore, according to the information processing apparatus according to the second aspect of the present disclosure, it is possible to, by using the trained estimation model, optimize the volume of resources used for each component according to a target of the quality of service of an application constructed based on a microservice architecture. As a result, it is possible to reduce costs required to keep the quality of service of the application (for example, power consumption and the like). According to the information processing apparatus according to the second aspect of the present disclosure, it is possible to generate a trained estimation model that can be used for such optimization of assignment of resources.

An embodiment according to one side of the present disclosure (hereinafter, also referred to as "the present embodiment") will be described below based on drawings. However, the present embodiment described below is merely an exemplification of the present disclosure in all respects. Various improvements or modifications may be made without departing from the scope of the present disclosure. In implementing the present disclosure, a specific configuration according to an embodiment may be appropriately adopted. Data that appears in the present embodiment is described in a natural language. However, more specifically, the data is specified with a computer-recognizable pseudo language, commands, parameters, a machine language or the like.

1. Application Example

Figure 1B:
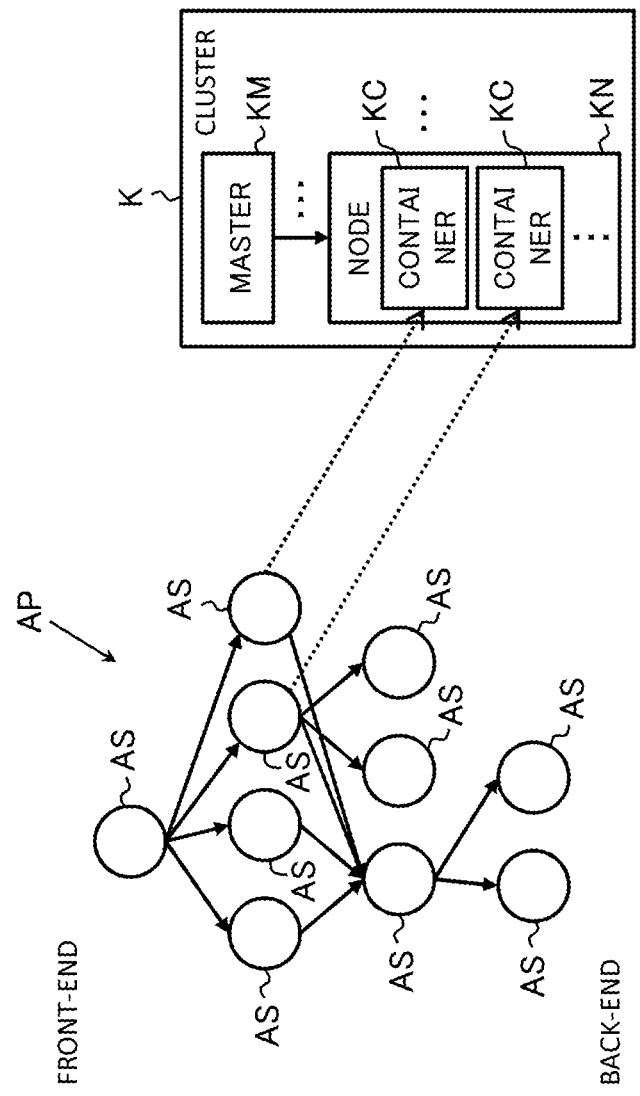
FIG. 1B schematically illustrates an example of an application constructed based on a microservice architecture.

FIG. 1A schematically exemplifies an example of a scene in which the present disclosure is applied. FIG. 1B schematically illustrates an example of an application AP constructed based on a microservice architecture.

A server apparatus 1 according to the present embodiment is one or more computers configured to execute the application AP and implement machine learning of an estimation model 5 to accomplish optimization of deployment of resources using a generated trained estimation model 5. The server apparatus 1 is an example of the information processing apparatuses of the above first and second aspects.

The application AP is constructed based on a microservice architecture and includes a plurality of components AS. Each component AS is configured to individually execute an application process. Thereby, each component AS individually provides a microservice. Each component AS may appropriately have a connection relationships from the front-end to the back-end according to information processing, service design, specifications and the like provided by the application AP. Routes from the front-end to the back-end may be referred to as service chains. Data transfer may be appropriately performed among the components AS.

Each component AS may be containerized. That is, each component AS may be executed on a container. A container may be configured to include one or more components. Arbitrary software may be used for operation of the application AP constructed based on the microservice architecture. As one example, publicly known software such as Kubernetes (R) may be used.

As one example of operation, one or more clusters K may be constructed in the server apparatus 1. Each cluster K is provided with a master KM and one or more nodes KN and is configured to execute the application AP. The master KM is configured to manage the cluster K by giving an instruction to each node KN to keep content set by an operator or the like. Each node KN provides an execution environment for an application process of each component AS. Each node KN may be configured to execute one or more pods, and each pod may be configured to develop one or more containers KC. Each of the master KM and the nodes KN may be configured with a physical machine or a virtual machine.

As illustrated in FIG. 1B, each component AS constituting the application AP may be executed on a given node KN and a given container KC. The number of containers KC to execute each component AS may be decided according to the component AS. Further, the number of containers KC developed on one node KN may be appropriately decided, and the number of components AS executed on one container KC may also be appropriately decided.

The application AP is only required to be constructed based on a microservice architecture, and the content thereof does not have to be especially limited. Information processing executed by and services provided by the application AP do not have to be especially limited and may be appropriately selected according to an embodiment. The name of the server apparatus 1 may be appropriately changed according to the content of information processing executed by the application AP.

In the example of FIG. 1A, the application AP provides information processing for one or more terminals T via a network. In one example, each terminal T may be an in-vehicle apparatus mounted on a vehicle. The in-vehicle apparatus may be a specially designed computer or a portable general-purpose computer such as a smartphone. The application AP may be configured to execute information processing related to vehicle operation such as analysis of data obtained from the in-vehicle apparatus to analyze a traffic situation and decision of a self-driving instruction. In another example, each terminal T may be a smartphone, another mobile terminal, a tablet PC (personal computer), a general-purpose PC or the like. The application AP may be, for example, a web application to provide a social networking service, an EC (electronic commerce) site, a content (for example, music, video, games or the like) distribution service or the like.

(Learning stage)

At a learning stage, the server apparatus 1 according to the present embodiment acquires a plurality of datasets 3. Then, the server apparatus 1 implements machine learning of the estimation model 5 using the acquired plurality of datasets 3.

Each dataset 3 is configured with a combination of training data 31 and a correct answer label 33. The training data 31 is configured to include workload information 311, resource use information 313 and service chain information 315. The workload information 311 is configured to show the state of a workload for an application constructed based on a microservice architecture in a learning target environment. The resource use information 313 is configured to show a use situation of resources for each of components included in the application (the volume of resources used for each component). The service chain information 315 is configured to show connection relationships among the components included in the application (for example, FIG. 1B). The correct answer label 33 is configured to show a true value of the quality of service of the application in a situation shown by the corresponding training data 31 (at that point of time or a point of time in the future).

The application targeted by collection of the datasets 3 used in machine learning is also referred to as "a learning target application". The application AP according to the present embodiment is an example of the learning target application. The datasets 3 may be collected from results of execution of the application AP by the clusters K.

The machine learning includes training the estimation model 5 such that, for each of the datasets 3, an estimated value of the quality of service calculated with the estimation model 5 based on the training data 31 corresponds to the true value shown by the correct answer label 33. By the machine learning processing, it is possible to, from workload information about an application, resource use information about resources and service chain information, generate a trained estimation model 5 that has acquired the ability of estimating the quality of service of the application. The generated trained estimation model 5 is used at an inference stage. Estimating may include recurrence or identification. The estimated value may be configured with a continuous value or a discrete value. Estimating may include predicting. The machine learning processing may be executed for the application AP operated on the clusters K offline.

(Inference Stage)

At the inference stage, the server apparatus 1 according to the present embodiment acquires target data 4 that includes workload information 41, resource use information 43 and service chain information 45. The workload information 41 is configured to show the state of a workload for an application constructed based on a microservice architecture in an estimation target environment. The resource use information 43 is configured to show a use situation of resources for each of components included in the application (the volume of resources used for each component). The service chain information 45 is configured to show connection relationships among the components included in the application.

The server apparatus 1 calculates an estimated value of the quality of service of the application based on the acquired target data 4 using the trained estimation model 5. The server apparatus 1 judges whether the calculated estimated value of the quality of service satisfies a target QoS or not. The target may be set in advance by a given method (for example, an instruction by an operator). If the calculated estimated value of the quality of service does not properly satisfy the target, the server apparatus 1 optimizes the volume of resources used for each component relative to the target, based on the estimated value of the quality of service calculated with the trained estimation model 5 by a predetermined optimization method. Then, the server apparatus 1 adjusts the volume of resources used for each of the components according to a result of the optimization.

The application targeted by estimating the quality of service using the trained estimation model 5 and optimizing the volume of resources based on an estimation result is also referred to as "an estimation target application". The application AP according to the present embodiment is also an example of the estimation target application. The server apparatus 1 may execute the above processing for optimizing the volume of resources online while operating the application AP by the clusters K. Thereby, the volume of resources (the nodes KN and the containers KC) for the clusters K used to execute the application AP may be adjusted. The resources are, for example, resources used for information processing, such as a processor resource and a memory resource. The processor may be an actual processor or a virtual processor. The memory may be an actual memory or a virtual memory. The adjustment of the volume of resources may be performed for each given unit, for example, for each node KN or for each pod, for each container KC.

(Effects)

As described above, according to the processing of the server apparatus 1 at the inference stage of the present embodiment, it is possible to, by using the trained estimation model 5, optimize the volume of resources used for each component AS according to a target of the quality of service of the application AP constructed based on the microservice architecture. As a result, it is possible to reduce costs required to keep the quality of service of the application AP. According to the processing of the server apparatus 1 at the learning stage of the present embodiment, it is possible to generate the trained estimation model 5 that can be used for such optimization of deployment of resources.

(Others)

The service chain information (315, 45) may be configured to express the connection relationships among the components AS in a graph form. The graph expresses data by edges and nodes. The components AS may be expressed by the edges, and the connection relationships among the components AS may be expressed by the nodes. As the data format of the graph, a publicly known data format such as a matrix may be used. Accordingly, the estimation model 5 may be configured to include a graph neural network. As the structure of the graph neural network, for example, the publicly known structure proposed by "The graph neural network model" by Scarselli, Franco, et al, IEEE transactions on neural networks 20.1 (2008): 61-80, searched online on the Internet online (URL: https://ieeexplore.ieee.org/abstract/document/4700287) on Nov. 5, 2021 and the like may be used. Thereby, it is possible to appropriately reflect the connection relationships among the components AS shown by the service chain information on the service quality estimation processing and, as a result, improve the estimation accuracy.

The quality of service may be determined based on at least any of delay time, execution time and a degree of having been normally processed about the application AP. The delay time may be time required from request for data transfer or the like to return in response thereto (latency). As one example, the delay time may be latency in real-time processing for a self-driving instruction or the like. The execution time may be time required for processing of the whole or a part of the application AP. As one example, the execution time may be time required for batch processing of a mapping system, a reducing system or the like. The degree of having been normally processed may be appropriately configured such that a degree of the processing of the application AP having been normally executed is shown. The degree of having been normally processed may be expressed by a degree of occurrence of errors (not having been normally processed). The degree may be expressed, for example, by the number of times, a rate or the like. As one example, if the application AP is an HTTP application, the degree of having been normally processed may be expressed by a rate of having normally processed HTTP requests from users (terminals T) and replied thereto per unit time. According to the above, it is possible to appropriately evaluate the quality of service and, as a result, appropriately accomplish optimization of the volume of resources.

The workload information (311, 41) may be configured to include at least any of the transaction volume, the volume of messages from users and the data transfer volume for the application AP. The transaction volume may be determined, for example, based on the amount of data received from the terminals T or the amount of processing requested from the terminals T. The volume of messages may be determined, for example, based on the number of requests from the terminals T. As one example, if the application AP is an HTTP application, the volume of messages may be the volume of HTTP requests. The volume of messages may be determined based on the total volume of messages or may be determined for each API (application programming interface). The data transfer volume may be determined, for example, based on the volume of transmission/reception of data such as image files. According to the above, it is possible to appropriately express a state of a workload and, as a result, appropriately accomplish optimization of the volume of resources.

The resource use information (313, 43) may be configured to include at least any of the amount of use of a processor, the amount of use of a memory and the amount of use of a network bandwidth that are assigned to each of the components AS included in the application AP. The processor may be an actual processor or a virtual processor. As the actual processor, for example, a CPU (central processing unit), a microprocessor, an FPGA (field-programmable gate array), a GPU (graphics processing unit) and the like may be included. The memory may be an actual memory or a virtual memory. As the actual memory, for example, a storage (a hard disk drive, a solid state drive and the like), a RAM (random access memory) and a cache memory (for example, a last level cache) may be included. As one example, the amount of use of the memory may be measured by the amount of input/output to/from the storage/RAM, the bandwidth of the cache memory, the capacity amount of the cache memory or the like. The amount of use of a network bandwidth may be measured by the amount of data input/output via the network. Each use amount may be expressed in a given unit. According to the above, it is possible to appropriately express a use situation of resources and, as a result, appropriately accomplish optimization of the volume of resources.

In the present embodiment, a learning target application and an estimation target application are the common application AP. In one example, since the configurations of the application AP at the learning stage and at the inference stage correspond to each other, the learning target application and the estimation target application may be mutually the same. However, the learning target application and the estimation target application do not necessarily have to be mutually the same. In another example, the learning target application and the estimation target application may be different from each other. For example, by the configuration of the components AS of the application AP being changed between the learning stage and the inference stage, the learning target application and the estimation target application may be different from each other. Or alternatively, the learning target application and the estimation target application may be mutually separate applications (for example, separate applications that are operated on mutually different server apparatuses). In this case, the component configuration of the learning target application and the component configuration of the estimation target application may correspond to each other or may be different from each other.

In the present embodiment, all the processings for the application AP, the machine learning of the estimation model 5 (generation of the trained estimation model 5) and the optimization of deployment of resources using the trained estimation model 5 are executed by the server apparatus 1. However, the processings do not necessarily have to be executed by the same apparatus. At least any of or at least a part of the processings may be executed by a computer other than the server apparatus 1. As one example, the processing for the application AP and the processings for the machine learning of the estimation model 5 and the optimization of deployment of resources using the trained estimation model 5 may be executed by mutually different apparatuses. As another example, the processings of the machine learning of the estimation model 5 and the optimization of deployment of resources using the trained estimation model 5 may be executed by the same server apparatus, and the application AP may be executed by another server apparatus. In this case, each server apparatus may be configured with one or more computers.

In the present embodiment, the server apparatus 1 may be configured with a plurality of computers. In this case, the processings of the application AP, the machine learning of the estimation model 5 and the optimization of deployment of resources using the trained estimation model 5 may be at least partially executed by the same computer or may be executed by mutually different computers. A computer to execute each processing may be appropriately selected.

2. Configuration Example

Hardware Configuration Example

Figure 2:
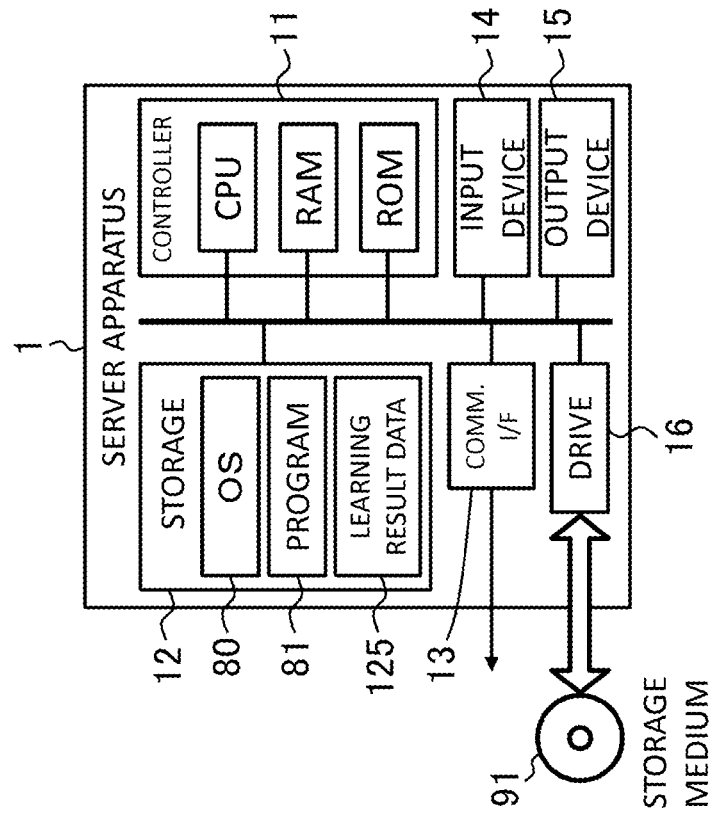
FIG. 2 schematically illustrates an example of a hardware configuration of a server apparatus according to an embodiment.

FIG. 2 schematically illustrates an example of a hardware configuration of the server apparatus 1 according to the present embodiment. As illustrated in FIG. 2, the server apparatus 1 according to the present embodiment is a computer in which a controller 11, a storage 12, a communication interface 13, an input device 14, an output device 15 and a drive 16 are electrically connected.

The controller 11 includes a CPU which is a hardware processor, a RAM, a ROM (read-only memory), a cache memory and the like and is configured to execute information processing based on a program and various kinds of data. The controller 11 (the CPU) is an example of a processor resource. The storage 12 is configured, for example, with a hard disk drive, a solid state drive or the like. The storage 12 is an example of a memory resource. In the present embodiment, the storage 12 stores an operating system 80, a program 81 and various kinds of information such as learning result data 125.

The operating system 80 provides basic functions for controlling the hardware of the server apparatus 1. The type of the operating system 80 does not have to be especially limited and may be appropriately selected according to an embodiment. The program 81 is a program for causing the server apparatus 1 to execute information processing for machine learning of the estimation model 5 (FIG. 6 to be described later) and information processing for optimization of deployment of resources using the trained estimation model 5 (FIG. 7 to be described later). The program 81 includes a series of instructions of the above information processings. An instructions part related to the information processing for machine learning of the estimation model 5 and an instructions part related to the information processing for optimization of deployment of resources may be held as separate programs, respectively. The learning result data 125 shows information about the trained estimation model 5 generated by machine learning.

The communication interface 13 is, for example, a wired LAN (local area network) module, a wireless LAN module or the like and is an interface for performing wired or wireless communication via a network. The server apparatus 1 may perform data communication with other computers via the communication interface 13.

The input device 14 is a device for performing input, for example, a mouse, a keyboard and the like. The output device 15 is a device for performing output, for example, a display, a speaker and the like. The operator can operate the server apparatus 1 by using the input device 14 and the output device 15. The input device 14 and the output device 15 may be integrally configured, for example, as a touch panel display.

The drive 16 is a device for reading various kinds of information such as a program stored in a storage medium 91. The program 81 may be stored in the storage medium 91. The storage medium 91 is a medium which, in order that a computer, other apparatuses, machines and the like can read stored various kinds of information such as a program, accumulates the information such as the program by electrical, magnetic, optical, mechanical or chemical action. The server apparatus 1 can acquire the program 81 from the storage medium 91.

Here, in FIG. 2, a disc-type storage medium such as a CD or a DVD is exemplified as one example of the storage medium 91. However, the type of the storage medium 91 is not limited to the disc type and may be of a type other than the disc type. As a storage medium other than the disc type medium, for example, a semiconductor memory such as a flash memory can be given. The type of the drive 16 may be appropriately selected according to the type of the storage medium 91.

As for the specific hardware configuration of the server apparatus 1, it is possible to appropriately perform omission, replacement and addition of components according to an embodiment. For example, the controller 11 may include a plurality of hardware processors. The hardware processors may be configured with a microprocessor, an FPGA, a GPU and the like. The storage 12 may be configured with the RAM and the ROM included in the controller 11. At least any of the input device 14, the output device 15 and the drive 16 may be omitted. The server apparatus 1 may be configured with a plurality of computers. In this case, hardware configurations of the computers may be the same or may not be the same. The server apparatus 1 may be a general-purpose information processing apparatus or the like, in addition to an information processing apparatus exclusively designed for provided services.

Software Configuration Example

Figure 3:
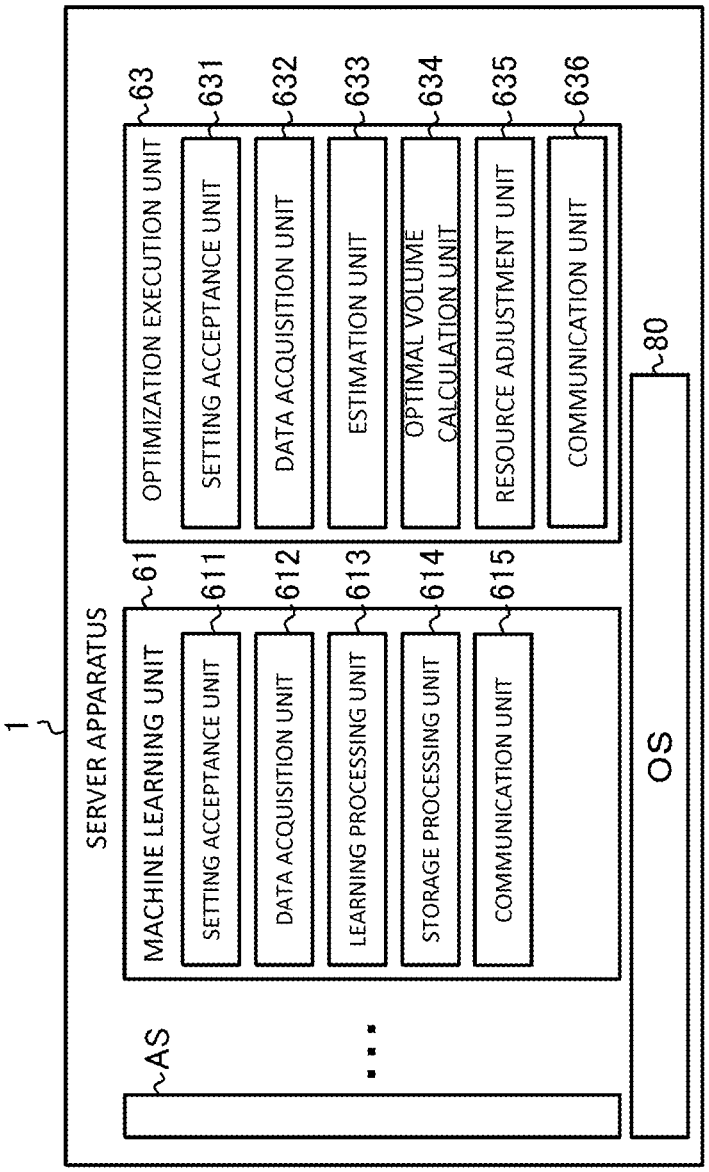
FIG. 3 schematically illustrates an example of a software configuration of the server apparatus according to the embodiment.

FIG. 3 schematically illustrates an example of a software configuration of the server apparatus 1 according to the present embodiment. The controller 11 of the server apparatus 1 develops the program 81 stored in the storage 12 on the RAM. Then, the controller 11 executes instructions included in the program 81 developed on the RAM, by the CPU. Thereby, as illustrated in FIG. 3, the server apparatus 1 according to the present embodiment executes the application AP on the operating system 80 and operates as a computer provided with a machine learning unit 61 and an optimization execution unit 63 as software modules. That is, in the present embodiment, each software module of the server apparatus 1 is realized by the controller 11 (the CPU). In the example of FIG. 3, the machine learning unit 61 and the optimization execution unit 63 are implemented as one component AS included in the application AP.

<Machine Learning Unit>

The machine learning unit 61 is configured to execute information processing related to machine learning of the estimation model 5. In the present embodiment, the machine learning unit 61 is provided with a setting acceptance unit 611, a data acquisition unit 612, a learning processing unit 613, a storage processing unit 614 and a communication unit 615. The setting acceptance unit 611 is configured to accept settings related to conditions for machine learning of the estimation model 5 (for example, a configuration of the estimation model 5, initial values of parameters, the number of repetitions and the like). The data acquisition unit 612 is configured to acquire a plurality of datasets 3 each of which is configured with a combination of the training data 31 and the correct answer label 33. The learning processing unit 613 is configured to implement machine learning of the estimation model 5 using the acquired plurality of datasets 3. The storage processing unit 614 is configured to generate information about the trained estimation model 5 generated by machine learning as the learning result data 125 and store the generated learning result data 125 into a given storage area. The learning result data 125 is appropriately configured to include information for reproducing the trained estimation model 5. The communication unit 615 is configured to transfer data to/from the master KM, other components AS and the like.

Example of Machine Learning Method

Figure 4:
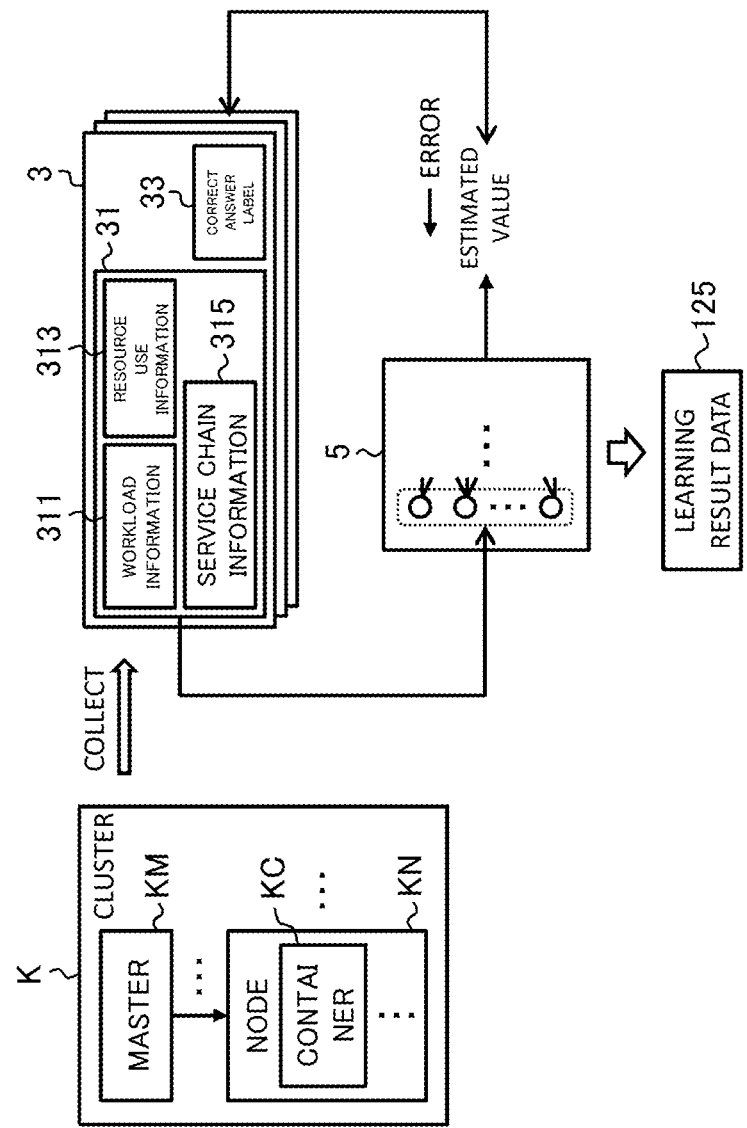
FIG. 4 schematically illustrates an example of a processing process for machine learning by the server apparatus according to the embodiment.

FIG. 4 schematically illustrates an example of a processing process for machine learning of the estimation model 5 by the machine learning unit 61. The estimation model 5 is configured with a machine learning model having one or more arithmetic parameters for executing estimation processing, the values of the arithmetic parameters being adjusted by machine learning. If it is possible to execute arithmetic processing for calculating an estimated value of the quality of service, the type, configuration and structure of a machine learning model adopted as the estimation model 5 are not especially limited and may be appropriately decided according to an embodiment.

As one example, the estimation model 5 may be configured with a neural network. In this case, weights of combinations among nodes (neurons), thresholds for the nodes and the like are examples of the arithmetic parameters. The type and structure of the neural network (for example, the type of each layer, the number of layers, the number of nodes of each layer, connection relationships among the nodes and the like) may be appropriately decided according to an embodiment. The estimation model 5 may be configured, for example, with a fully-connected neural network, a convolutional neural network, a recurrent neural network or the like. In the present embodiment, the service chain information (315, 45) may be configured to express the connection relationships among the components AS in a graph form. Accordingly, the estimation model 5 may be configured to include a graph neural network as a component that processes at least the service chain information (315, 45) among pieces of inputted data.

The datasets 3 used for machine learning may be collected from results of execution of the application AP by the clusters K. In one example, the datasets 3 may be collected by the data acquisition unit 612. In another example, the datasets 3 may be collected by another component or a computer other than the server apparatus 1. In this case, the data acquisition unit 612 may acquire the datasets 3 collected by the other component or the other computer in a given method. The datasets 3 may be automatically generated by operation of a computer or may be manually generated by at least partially including operations by an operator.

Each dataset 3 is configured with a combination of the training data 31 and the correct answer label 33. In the present embodiment, the training data 31 is configured to include the workload information 311, the resource use information 313 and the service chain information 315. The correct answer label 33 is configured to show a true value of the quality of service of the application AP in a situation shown by the pieces of information (311, 313, 315) of associated training data 31. The true value shown by the correct answer label 33 may be related to the quality of service of the whole application AP. The quality of service may be determined based on at least any of delay time, execution time and a degree of having been normally processed. The true value may be obtained by measuring the quality of service of the application AP based on at least any of the above indicators according to the pieces of information (311, 313, 315).

As machine learning processing, the learning processing unit 613 trains the estimation model 5 such that, for each dataset 3, an output obtained from the estimation model 5 by giving the training data 31 (an estimated value of the quality of service) matches the correct answer label 33. That is, the learning processing unit 613 implements machine learning of the estimation model 5 using the training data 31 of each dataset 3 as input data and using the correct answer label 33 as a teacher signal. Training the estimation model 5 includes adjusting (optimizing) the values of the arithmetic parameters of the estimation model 5 such that an output obtained for the training data 31 (an estimated value of the quality of service) matches the correct answer label 33. A method for adjusting the arithmetic parameters (a method for solving the optimization problem) may be appropriately decided according to the type, configuration, structure and the like of machine learning adopted for the estimation model 5.

As one example of the adjustment method, if the estimation model 5 is configured with a neural network, the learning processing unit 613 inputs the training data 31 of each dataset 3 to the estimation model 5 and executes forward-propagation arithmetic processing of the estimation model 5. As a result of the arithmetic processing, the learning processing unit 613 acquires a result of estimating the quality of service of the application AP (an estimated value of the quality of service) based on the pieces of information (311, 313, 315) included in the training data 31, from the estimation model 5. The learning processing unit 613 calculates an error between the obtained estimated value and a true value shown by a corresponding correct answer label 33 and further calculates the gradient of the calculated error. The learning processing unit 613 calculates errors of the values of the arithmetic parameters of the estimation model 5 by back-propagating the calculated error gradient by an error back-propagation method. The learning processing unit 613 updates the values of the arithmetic parameters based on the calculated errors.

By the series of update processing, the learning processing unit 613 adjusts the values of the arithmetic parameters of the estimation model 5 such that the sum of errors between estimated values obtained by giving the pieces of training data 31 and true values shown by the correct answer labels 33 is reduced. The adjustment of the values of the arithmetic parameters may be repeated until a predetermined condition is satisfied, the predetermined condition being, for example, executing a set number of repetitions of the adjustment or the calculated sum of errors being equal to or below a threshold. For example, conditions for machine learning, such as a loss function and a learning rate may be appropriately set according to an embodiment. By the machine learning processing, the trained estimation model 5 can be generated.

The storage processing unit 614 generates the learning result data 125 for reproducing the trained estimation model 5 generated by the above machine learning. If it is possible to reproduce the trained estimation model 5, the configuration of the learning result data 125 is not especially limited and may be appropriately decided according to an embodiment. As one example, the learning result data 125 may include information showing the values of the arithmetic parameters of the estimation model 5 obtained by the above adjustment of machine learning. In some cases, the learning result data 125 may further include information showing the structure of the estimation model 5. The structure may be identified, for example, by the number of layers from an input layer to an output layer, the type of each layer, the number of neurons included in each layer, combination relationships among neurons of adjacent layers and the like. The storage processing unit 614 stores the generated learning result data 125 into a predetermined storage area.

<Optimization Execution Unit>

Returning to FIG. 3, the optimization execution unit 63 is provided with the trained estimation model 5 by keeping the learning result data 125. The optimization execution unit 63 is configured to execute information processing related to optimization of deployment of resources using the trained estimation model 5. In the present embodiment, the optimization execution unit 63 is provided with a setting acceptance unit 631, a data acquisition unit 632, an estimation unit 633, an optimal volume calculation unit 634, a resource adjustment unit 635 and a communication unit 636.

Figure 5:
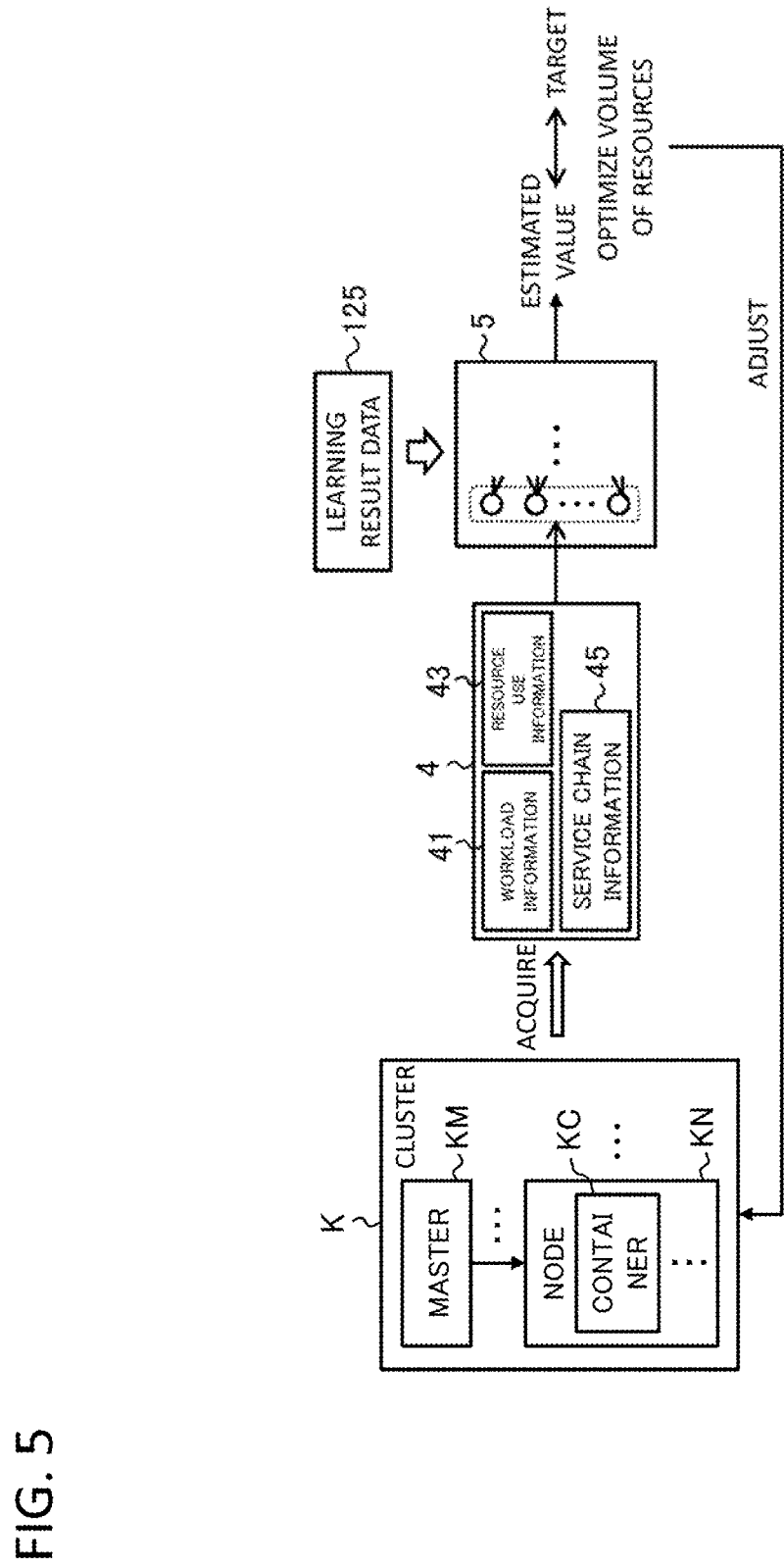
FIG. 5 schematically illustrates an example of a processing process for optimization of the volume of resources by the server apparatus according to the embodiment.

FIG. 5 schematically illustrates an example of a processing process for optimization of the volume of resources used for each component AS of the application AP, by the optimization execution unit 63. The setting acceptance unit 631 is configured to accept settings related to conditions for optimization (for example, a target of the quality of service and an optimization method to be used). The data acquisition unit 632 is configured to acquire the target data 4. In the present embodiment, the target data 4 is configured to include the workload information 41, the resource use information 43 and the service chain information 45. In one example, the data acquisition unit 632 may acquire the target data 4 directly from the clusters K that operates the application AP. In another example, the target data 4 may be generated by another component or another computer, and the data acquisition unit 632 may acquire the target data 4 directly or indirectly from the other component or the other computer.

The estimation unit 633 is configured to calculate an estimated value of the quality of service of the application AP based on the acquired target data 4 by using the trained estimation model 5. The calculated estimated value may be related to the quality of service of the whole application AP. The optimal volume calculation unit 634 is configured to judge whether the calculated estimated value of the quality of service properly satisfies a target or not. In addition, the optimal volume calculation unit 634 is configured to, if the calculated estimated value of the quality of service does not properly satisfy the target, optimize the volume of resources relative to the target, based on the estimated value of the quality of service calculated with the trained estimation model by a predetermined optimization method. The resource adjustment unit 635 is configured to adjust the volume of resources (for example, the number of nodes KN and the number of containers KC) used for each component AS according to a result of the optimization. The communication unit 636 is configured to transfer data to/from the master KM, other components AS and the like.

<Others>

In the present embodiment, description is made on a case where all the software modules of the server apparatus 1 are realized by a general-purpose CPU. However, a part or all of the above software modules may be realized by one or more dedicated processors. Each of the above modules may be realized as a hardware module. As for the software configuration of the server apparatus 1, omission, replacement and addition of modules may be appropriately performed according to an embodiment.

In the present embodiment, each of the machine learning unit 61 and the optimization execution unit 63 is implemented as one component AS. However, the implementation form of each software module may not be limited to such an example. At least one of the machine learning unit 61 and the optimization execution unit 63 may be implemented with a plurality of components AS. Each of the machine learning unit 61 and the optimization execution unit 63 may be executed on one or more containers KC. At least a part of the components AS constituting the machine learning unit 61 and the optimization execution unit 63 may be executed on the same container KC, or each of the components AS may be executed on a separate container KC. At least one of the machine learning unit 61 and the optimization execution unit 63 may be executed as an application process separate from the application AP.

3. Operation Example

Machine Learning of Estimation Model

Figure 6:
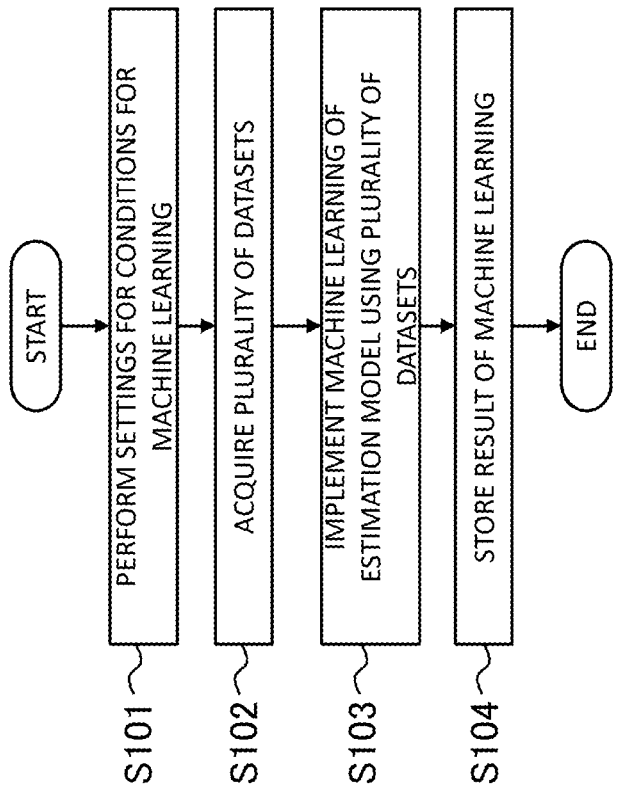
FIG. 6 is a flowchart illustrating an example of a processing procedure for the machine learning by the server apparatus according to the embodiment.
Figure 7:
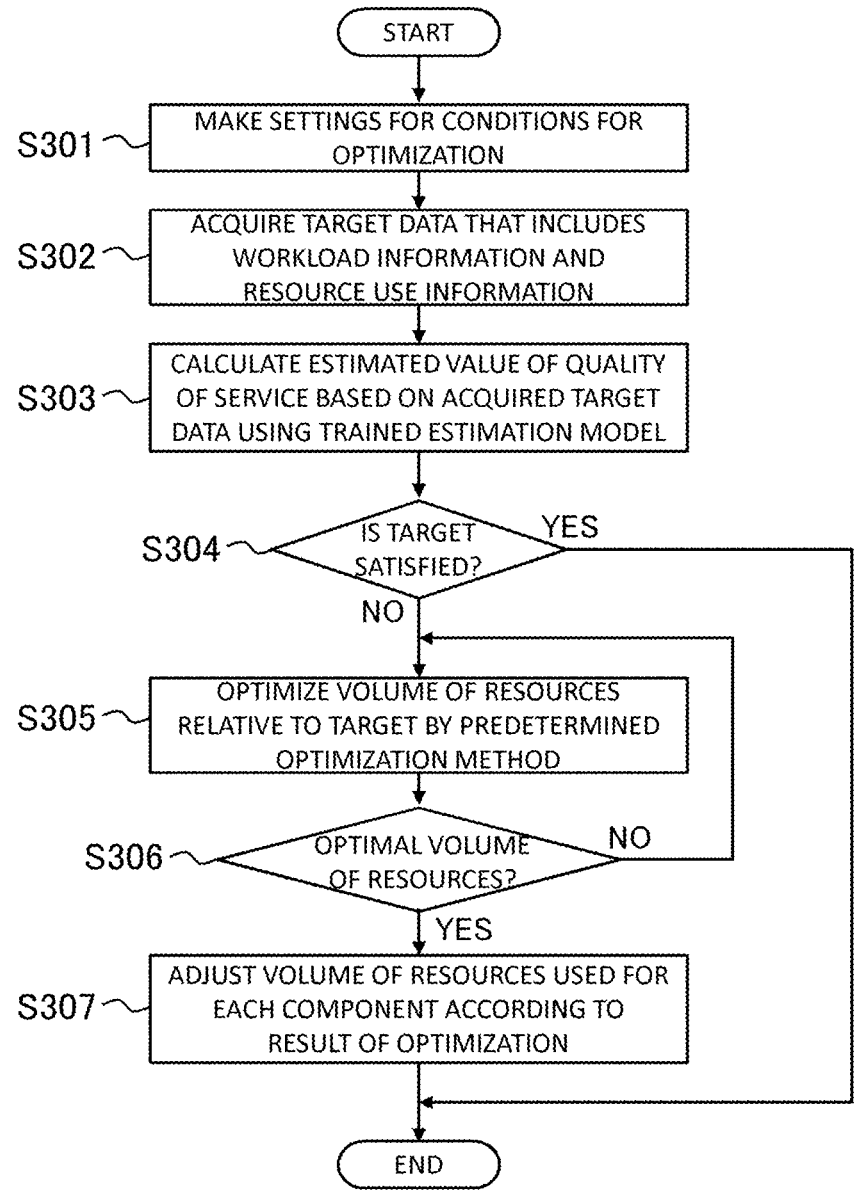
FIG. 7 is a flowchart illustrating an example of a processing procedure for optimizing the volume of resources by the server apparatus according to the embodiment.

FIG. 6 is a flowchart illustrating an example of the processing procedure for the machine learning of the estimation model 5 by the server apparatus 1 (the machine learning unit 61) according to the present embodiment. The processing procedure below is an example of an information processing method for generation of a model. However, the model generation processing procedure below is merely an example, and each step may be changed as far as possible. Further, for the model generation processing procedure below, it is possible to appropriately perform omission, replacement and addition of steps according to an embodiment.

(Step S101)

At step S101, the controller 11 operates as the setting acceptance unit 611 and accepts settings for conditions for machine learning of the estimation model 5.

The conditions the settings for which are accepted may be appropriately decided according to an embodiment. As one example, the controller 11 may accept setting of the number of repetitions in the machine learning. In this case, the number of repetitions may be specified by an input by an operator via the input device 14. In addition, the controller 11 may accept initial settings for a machine learning model constituting the estimation model 5. The structure of the machine learning model and initial values of arithmetic parameters may be given by a template or may be decided by input by the operator. The controller 11 may acquire input data (workload information, resource use information and service chain information) to be given to the estimation model 5 and decide the number of parameters of the machine learning model based on the acquired input data. In the case of performing additional learning or relearning, the controller 11 may make initial settings for the estimation model 5 based on learning result data obtained by machine learning in the past.

When the acceptance of the settings is completed, the controller 11 advances the processing to the next step S102. The timing of executing the processing of step S101 may not be limited to this example. The processing of step S101 may be executed at a given timing before processing of step S103 to be described later is executed. The processing of step S101 may be executed independently of the processing procedure of this flowchart. Further, the processing of step S101 may be omitted. In this case, each condition may be decided in advance by a given method.

(Step S102)

At step S102, the controller 11 operates as the data acquisition unit 612 and acquires a plurality of datasets 3. Each dataset 3 may be acquired through a given route. In one example, the controller 11 may acquire the datasets 3 directly from the clusters K. In another example, the controller 11 may acquire each dataset 3, for example, via a network, the storage medium 91, another computer, an external storage or the like. The controller 11 may acquire the datasets 3 from a plurality of acquisition destinations. The number of datasets 3 to be acquired may not be especially limited and may be appropriately decided so that machine learning can be implemented. When the plurality of datasets 3 are acquired, the controller 11 advances the processing to the next step S103.

(Step S103)

At step S103, the controller 11 operates as the learning processing unit 613 and implements machine learning of the estimation model 5 using the acquired plurality of datasets 3. As machine learning processing, the controller 11 adjusts the values of arithmetic parameters of the estimation model 5 such that, for each dataset 3, an output obtained for the training data 31 matches the correct answer label 33.

As one example of an adjustment method, the controller 11 inputs the training data 31 of each dataset 3 to the estimation model 5 and executes forward-propagation arithmetic processing of the estimation model 5. As a result of the arithmetic processing, the controller 11 acquires an estimated value of the quality of service of the application AP calculated based on the pieces of information (311, 313, 315) included in the training data 31, from the estimation model 5. The controller 11 calculates an error between the obtained estimated value and a true value shown by a corresponding correct answer label 33. The controller 11 adjusts the values of the arithmetic parameters of the estimation model 5 by an error back-propagation method such that the sum of calculated errors is reduced. The adjustment of the values of the arithmetic parameters may be repeated until a predetermined condition is satisfied. As one example, if the number of repetitions is set by the processing of step S101, the controller 11 may repeat the adjustment of the values of the arithmetic parameters of the estimation model 5 until the number of repetitions reaches the set number of times. As a result of executing the machine learning processing, the trained estimation model 5 can be generated. When the machine learning processing is completed, the controller 11 advances the processing to the next step S104.

(Step S104)

At step S104, the controller 11 operates as the storage processing unit 614 and generates information about the trained estimation model 5 generated by the machine learning as the learning result data 125. Then, the controller 11 stores the generated learning result data 125 into a storage area.

The storage area may be, for example, the RAM in the controller 11, the storage 12, an external storage, a storage medium or a combination thereof. The storage medium may be, for example, the storage medium 91 such as a CD or a DVD, and the controller 11 may store the learning result data 125 into the storage medium via the drive 16. The external storage may be, for example, a data server such as an NAS (network attached storage). In this case, the controller 11 may store the learning result data 125 into the data server via a network using the communication interface 13. The external storage may be, for example, a storage that is externally connected to the server apparatus 1.

When the storage of the learning result data 125 is completed, the controller 11 ends the processing procedure related to machine learning of the estimation model 5.

The generated learning result data 125 may be directly or indirectly provided for the optimization execution unit 63 from the machine learning unit 61 via the communication units (615, 636) at a given timing. Further, the controller 11 may update or newly create the learning result data 125 by repeatedly executing at least the processings from steps S102 to S104 of the above processing procedure. At the time of the repetition, change, modification, addition, deletion or the like of at least a part of the plurality of datasets 3 used for machine learning may be appropriately executed. Then, the controller 11 may update the learning result data 125 held by the optimization execution unit 63 by providing the updated or newly generated learning result data 125 for the optimization execution unit 63 from the machine learning unit 61.

[Optimization of Deployment of Resources]

FIG. 7 is a flowchart illustrating an example of a processing procedure for optimizing the volume of resources used for the application AP by the server apparatus 1 (the optimization execution unit 63) according to the present embodiment. The processing procedure below is an example of an information processing method for optimization. However, the optimization processing procedure below is merely an example, and each step may be changed as far as possible. Further, for the optimization processing procedure below, it is possible to appropriately perform omission, replacement and addition of steps according to an embodiment.

(Step S301)

At step S301, the controller 11 operates as the setting acceptance unit 631 and accepts settings for conditions for optimization.

The conditions the settings for which are accepted may be appropriately decided according to an embodiment. As one example, the controller 11 may accept setting of a target of the quality of service. The target may be set with a numerical value (also referred to as a target value). As one example, the target value may be set according to a value of the quality of service measured during a given period. If the quality of service is determined based on at least one of delay time and execution time, the target value may be specified with a statistic such as a mean value, a percentile value (for example, a 90 percentile value, a 95 percentile value, a 99 percentile value or a 99.9 percentile value), a median, a minimum value and a maximum value. The target value may be specified by input by the operator.

Further, the controller 11 may accept setting of a predetermined optimization method in the processing of step S305 to be described later. The predetermined optimization method may be decided by a given method. As one example, the predetermined optimization method may be selected from between a steepest descent method and Bayesian optimization. The selection may be performed by an operation via the input device 14 by the operator. According to the steepest descent method, it is possible to optimize the volume of resources relative to the target of the quality of service in a short time. Therefore, it is desirable to select the steepest descent method in order to optimize the volume of resources in a time zone in which the workload significantly fluctuates. In comparison, according to Bayesian optimization, though more time is required for optimization than the steepest descent method, it is possible to calculate a more optimal volume of resources relative to the target of the quality of service. Therefore, it is desirable to select Bayesian optimization in order to optimize the volume of resources in a time zone in which the workload does not fluctuate much or fluctuates periodically. Thus, by selecting an optimization method from among a plurality of optimization methods with different characteristics, it is possible to accomplish optimization suitable for the state of the workload at step S305 to be described later.

When the acceptance of the settings is completed, the controller 11 advances the processing to the next step S302. The timing of executing the processing of step S301 may not be limited to this example. For example, setting of the target of the quality of service may be executed at a given timing before processing of step S104 to be described later is executed. Setting of an optimization method may be executed at a given timing before processing of step S305 to be described later is executed. The processing of step S301 may be executed independently of the processing procedure of this flowchart. Further, the processing of step S301 may be omitted. In this case, each condition may be decided in advance by a given method.

(Step S302)

At step S302, the controller 11 operates as the data acquisition unit 632 and acquires the target data 4. The target data 4 may be acquired through a given route. As one example, if optimization of the volume of resources is implemented online, the controller 11 may acquire the information (41, 43, 45) constituting the target data 4 from the clusters K. When the target data 4 is acquired, the controller 11 advances the processing to the next step S303.

(Step S303)

At step S303, the controller 11 operates as the estimation unit 633 and makes settings for the trained estimation model 5 by referring to the learning result data 125. The learning result data 125 may be acquired at a given timing before processing of step S303 is executed. Then, the controller 11 calculates an estimated value of the quality of service of the application AP based on the acquired target data 4 using the trained estimation model 5. Arithmetic processing of the trained estimation model 5 may be appropriately executed according to a machine learning model adopted as the estimation model 5. As one example, if the estimation model 5 is configured with a neural network, the controller 11 inputs the acquired target data 4 to the trained estimation model 5 and executes forward-propagation arithmetic processing of the trained estimation model 5. As a result of this arithmetic processing, the controller 11 can acquire a result of estimating the quality of service (the estimated value) from the trained estimation model 5. When the estimated value of the quality of service is acquired, the controller 11 advances the processing to the next step S304.

(Step S304)

At step S304, the controller 11 operates as the optimal volume calculation unit 634 and judges whether the calculated estimated value of the quality of service properly satisfies the set target or not.

In one example, properly satisfying the target may include satisfying the target with a proper value. As a specific example, if a target value of the delay time is set as the target of the quality of service, and an estimated value of the delay time is calculated as the estimated value of the quality of service by the processing of step S303, the controller 11 may compare the calculated estimated value of the delay time with the target value. Then, the controller 11 may judge that the estimated value of the quality of service satisfies the target when the estimated value of the delay time is below the target value and judge that the estimated value of the quality of service does not satisfy the target when the estimated value of the delay time exceeds the target value. If the estimated value of the delay time and the target value are equal, the controller 11 may judge that the estimated value of the quality of service either satisfies or does not satisfy the target.

If a target value of the execution time is set as the target of the quality of service, and an estimated value of the execution time is calculated by the processing of step S303, the controller 11 may compare the calculated estimated value of the execution time with the target value. Then, the controller 11 may judge that the estimated value of the quality of service satisfies the target when the estimated value of the execution time is below the target value and judge that the estimated value of the quality of service does not satisfy the target when the estimated value of the execution time exceeds the target value. If the estimated value of the execution time and the target value are equal, the controller 11 may judge that the estimated value of the quality of service either satisfies or does not satisfy the target.

If a target value of the degree of having been normally processed is set as the target of the quality of service, and an estimated value of the degree of the application AP having been normally processed is calculated by the processing of step S303, the controller 11 may compare the calculated estimated value of the degree of having been normally processed with the target value. Then, the controller 11 may judge that the estimated value of the quality of service satisfies the target when the estimated value of the degree of having been normally processed exceeds the target value (the degree of errors is below a target value) and judge that the estimated value of the quality of service does not satisfy the target when the estimated value of the degree of having been normally processed is below the target value (the degree of errors exceeds the target value). If the estimated value of the degree of having been normally processed and the target value are equal, the controller 11 may judge that the estimated value of the quality of service either satisfies or does not satisfy the target.

In another example, satisfying the target may include satisfying the target within a proper range. In this case, the controller 11 may judge whether the target is properly satisfied or not according to whether the calculated estimated value of the quality of service is within a set target range or not. That is, in addition to the above case where the estimated value of the quality of service does not satisfy the target value, in a case where resources are excessively used relative to the target of the quality of service, the controller 11 may also judge that the target is not properly satisfied. The target range may be set by a given method. For example, the upper limit and the lower limit of the target value may be set as the target range by specification or the like by the operator. Additionally, a target value and a threshold that defines a range of at least one of the upper limit and the lower limit of the target value may be set by specification or the like by the operator. If the upper or lower limit of the target range and the estimated value are equal, the controller 11 may judge that the target is either properly satisfied or not.

If judging that the calculated estimated value of the quality of service satisfies the target, the controller 11 ends the processing procedure related to optimization of the volume of resources. On the other hand, if judging that the calculated estimated value of the quality of service does not satisfy the target, the controller 11 advances the processing to the next step S305. If the target value is specified with a statistics such as a mean value, the controller 11 may repeatedly execute the processings of steps S302 and S303 to calculate an estimated value corresponding to the statistics of the target value.

(Steps S305 to S307)

At step S305, the controller 11 operates as the optimal volume calculation unit 634 and optimizes the volume of resources relative to the target, based on the estimated value of the quality of service calculated with the trained estimation model 5, by a predetermined optimization method. The controller 11 calculates an optimal volume of resources relative to the target by the predetermined optimization method such that the estimated value of the quality of service calculated with the trained estimation model 5 properly satisfies the target. In one example, the optimal volume of resources that properly satisfies the target may be the minimum volume of resources that satisfies the target.

As one example, if the steepest descent method is selected as the predetermined optimization method, the controller 11 may calculate (estimate) the optimal volume of resources relative to the target according to Formulas 1 and 2 below.

[Formula 1]

$$\min\_cost(r, Target\_Qos) = \Sigma r + \rho \times \varphi(L(w,r), Target\_Qos) \quad \text{(Formula 1)}$$

[Formula 2]

$$\varphi(x,y) = \max(0, x-y) \quad \text{(Formula 2)}$$

Here, r indicates the use situation (the amount of use) of resources, and w indicates the state of the workload. The use situation of resources and the state of the workload may be expressed with vectors. Here, Target_Qos indicates a set target value of the quality of service. L(w,r) indicates an estimated value of the quality of service calculated with the trained estimation model 5. ρ indicates a penalty cost and may be appropriately given.

As another example, if Bayesian optimization is selected as the predetermined optimization method, the controller 11 may calculate the optimal volume of resources relative to the target according to Formulas 3 and 4 below.

[Formula 3]

$$\min\_cost(r, Target\_Qos) = \Sigma r + \arg\min_\lambda f(\lambda) \quad \text{(Formula 3)}$$

[Formula 4]

$$\lambda = (L(w,r), Target\_Qos) \quad \text{(Formula 4)}$$

At step S306, the controller 11 operates as the optimal volume calculation unit 634 and judges whether the volume of resources calculated by the predetermined optimization method is optimal or not (that is, whether the volume of resources tentatively obtained by the optimization method has reached the minimum volume of resources or not). If the calculated volume of resources is optimal, the controller 11 advances the processing to the next step S307. On the other hand, if the calculated volume of resources is not optimal, the controller 11 returns the processing to step S305 and executes the calculation of the volume of resources by the predetermined optimization method again. At the time of repeatedly executing the processing of step S305, the controller 11 may identify the optimal volume of resources by repeatedly using the estimated value obtained by the first arithmetic operation of the trained estimation model 5. Or alternatively, the controller 11 may update the estimated value of the quality of service used to identify the optimal volume of resources by executing the arithmetic processing of the trained estimation model 5 again using information about the tentative volume of resources calculated by the processing of step S305 as new resource use information. The update of the estimated value may be performed each time the processing of step S305 is repeated a given number of times (for example, every time).

At step S307, the controller 11 operates as the resource adjustment unit 635 and outputs a result of the optimization to the computer that operates the application AP. Thereby, the controller 11 adjusts (sets) the volume of resources used for each component AS according to the result of the optimization. As one example, if the application AP is operated on the server apparatus 1, the controller 11 may adjust the volume of resources such that each component AS is executed with the calculated optimal volume of the resources. As another example, if the application AP is operated on another apparatus, the controller 11 may instruct the other apparatus to adjust the volume of resources by transmitting the result of the optimization to the other apparatus.

Adjustment of the volume of resources may be appropriately executed according to an embodiment. For example, the adjustment of the volume of resources may include at least any of scale-out, scale-in, scale-up and scale-down for the components AS (the nodes KN and the containers KC). As one example, if each component AS included in the application AP is executed on containers KC, optimizing the volume of resources in the processings of steps S305 and S306 may include calculating the optimal volume of resources and calculating the optimal number of containers KC to execute each component AS from the calculated optimal volume of the resources. Accordingly, adjusting the volume of resources in the processing of step S307 may include adjusting the number of containers KC to execute each component AS such that the number of containers KC to execute each component AS becomes the calculated optimal number. According to this method, it is possible to easily adjust the volume of resources used for the application AP configured with the plurality of components AS each of which is containerized.

At steps S305 and S306, the controller 11 may calculate a plurality of candidates for the optimal volume of resources. Accordingly, at step S307, the controller 11 may select one candidate from among the plurality of calculated candidates and adjust the volume of resources used for each component AS according to the selected optimization candidate. The selection may be performed by input by the operator or may be performed based on a predetermined criterion (for example, the smallest volume of used resources being to be selected).

When the adjustment of the volume of resources is completed, the controller 11 ends the processing procedure related to optimization of the volume of resources. The controller 11 may repeatedly execute at least the processings of steps S302 to S307 in the above processing procedure at given timings. Thereby, the controller 11 may continuously optimize the volume of resources used for the application AP, using the trained estimation model 5.

[Characteristics]

In the present embodiment, it is possible to, by the processings of the above steps S102 and S103, generate the trained estimation model 5 that has acquired an ability of estimating the quality of service of the application from the workload information and the resource use information about resources. According to this trained estimation model 5, it is possible to estimate the quality of service of the application AP from the state of the workload and the situation of deployment of resources for each component AS. That is, it is possible to predict a correspondence relationship between deployment of resources for each component AS and the quality of service of the application AP according to the state of the workload. By utilizing this, it is possible to, according to the processings of the above steps S302 to S307, use the trained estimation model 5 to optimize the volume of resources used for each component AS according to a target of the quality of service of the application AP constructed based on the microservice architecture. As a result, it is possible to reduce costs required to keep the quality of service of the application AP.

Further, in the present embodiment, input data to the estimation model 5 further includes the service chain information. Thereby, even if the component configuration of the application AP is changed, the estimation model 5 can identify the component configuration of the application AP based on the inputted service chain information, and, as a result, it is possible to keep the estimation accuracy of the quality of service. Therefore, according to the present embodiment, even if the component configuration of the application AP is changed, it is possible accomplish optimization of the volume of resources with a high accuracy.

4. Modifications

An embodiment of the present disclosure has been described above in detail. However, the description so far is merely an exemplification of the present disclosure in all respects. It goes without saying that various improvements or modifications can be made without departing from the scope of the present disclosure. For example, changes as below are possible. Modifications below can be appropriately combined.

In the above embodiment, the service chain information 315 may be omitted from the training data 31 of each dataset 3 acquired by the processing of step S102. Accordingly, the service chain information 45 may be omitted from the target data 4 acquired by the processing of step S302.

Further, in the above embodiment, the estimation model 5 may be configured to further accept input of information other than the workload information, the resource use information and the service chain information. The estimation model 5 may be configured to further output information other than an estimated value of the quality of service. As the estimation model 5, a machine learning model other than a neural network may be adopted.

5. Example

In order to verify the effectiveness of the present disclosure, information processing apparatuses according to an example and a comparative example below were configured. However, the present disclosure is not limited to the example below.

Figure 8:
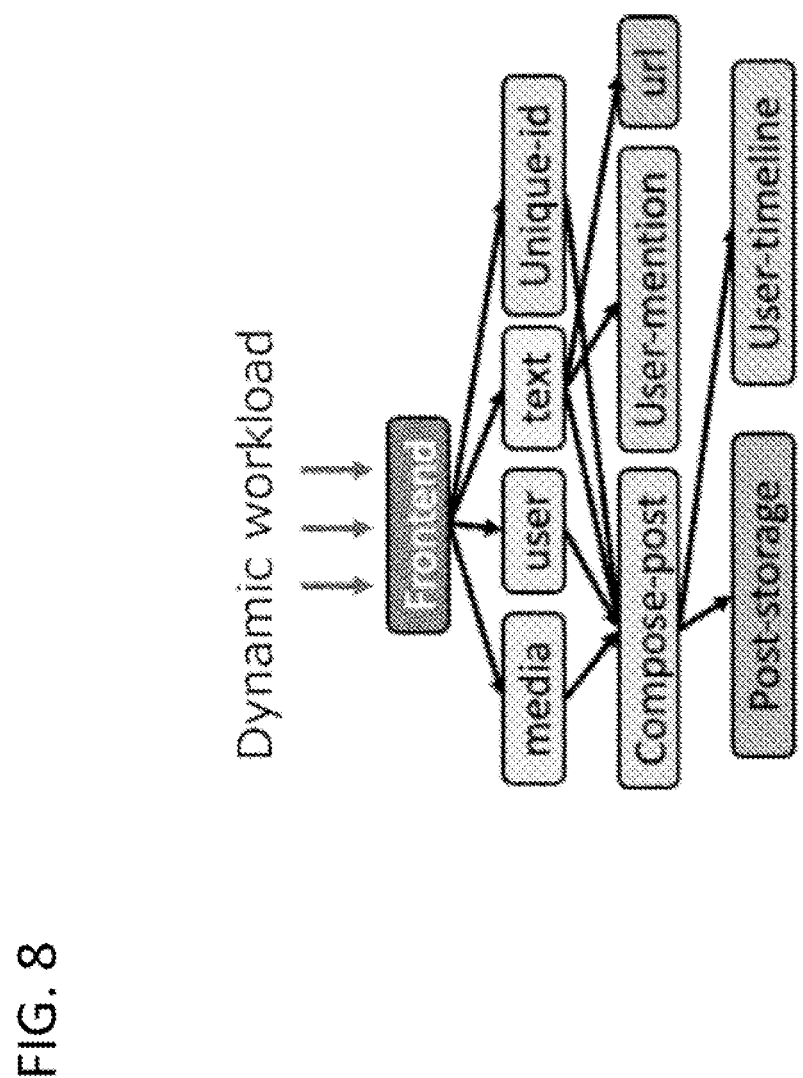
FIG. 8 illustrates a first sample of an application of a microservice architecture for which the volume of resources has been optimized by an example and a comparative example.
Figure 9:
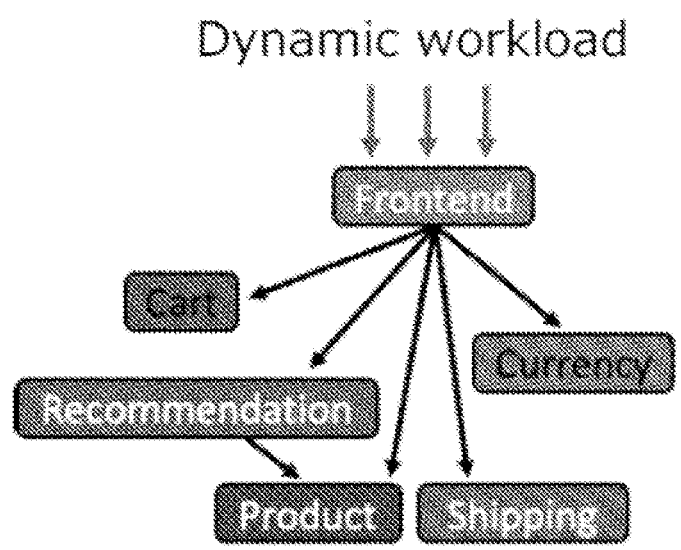
FIG. 9 illustrates a second sample of the application of the microservice architecture for which the volume of resources has been optimized by the example and the comparative example.

FIG. 8 illustrates a first sample of an application constructed based on a microservice architecture. FIG. 9 illustrates a second sample of the application constructed based on the microservice architecture. The workload for the first sample was set to 500 TPS (transactions per second), and the target of the quality of service (delay time) was set to 30 microseconds. The workload for the second sample was set to 500 TPS, and the target of the quality of service (delay time) was set to 150 microseconds.

In the information processing apparatus according to the example, a trained estimation model was generated for each sample of the application by a method similar to that of the above embodiment. For the estimation model, a neural network was adopted. The workload information was configured with the transaction volume, and the resource use information was configured with the amount of use of a processor (a CPU) for each component. The service chain information was configured to show connection relationships among the components in a graph form. The number of datasets used for machine learning was about 50,000 for each sample. The number of epochs, the batch size and the learning rate were set to 70,000, 256 and $2.0 \times 10^{-4}$, respectively. By the information processing apparatus according to the example, the volume of resources (the amount of assignment of the CPU) to be used for each sample was optimized using the generated trained estimation model, by a method similar to that of the above embodiment. The steepest descent method was used as a predetermined optimization method.

In comparison, in the information processing apparatus according to the comparative example, the volume of resources (the amount of assignment of the CPU) to be used for each sample was adjusted by Horizontal Pod Autoscaler of Kubernetes ("Horizontal Pod Autoscaler|Kubernetes", searched online on the Internet (URL: https://kubernetes.io/docs/tasks/run-application/horizontal-pod-autoscale/) on Nov. 5, 2021).

TABLE 1

|  | Example | Comparative Example |
| --- | --- | --- |
| First Sample | 2324 | 2711 |
| Second Sample | 2220 | 2560 |

Table 1 above illustrates results of adjusting the volume of resources used for the application of each sample by the example and the comparative example (in the unit of millicore). As shown by the above results, in the example, it was possible to accomplish the target of the quality of service with a smaller volume of resources (a smaller CPU quota) in comparison with the comparative example. From this result, it was known that, according to the present disclosure, it is possible to optimize the volume of resources to be used, according to a set target of the quality of service.

6. Supplementary Notes

The processings and means described in the present disclosure can be freely combined and implemented as far as technical contradiction does not occur.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a floppy (R) disk, a hard disk drive (HDD) and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. An information processing apparatus comprising a controller comprising at least one processor, the controller being configured to execute:
   acquiring target data that includes workload information about an application constructed based on a microservice architecture and resource use information about resources used for each of components included in the application in an estimation target environment;
   calculating an estimated value of quality of service of the application based on the acquired target data by using a trained estimation model;
   if the calculated estimated value of the quality of service does not properly satisfy a target, optimizing a volume of the resources relative to the target, based on the estimated value of the quality of service calculated with the trained estimation model by a predetermined optimization method; and
   adjusting the volume of the resources used for each of the components according to a result of the optimization,
   wherein the target data further includes service chain information showing connection relationships among the components included in the application.

2. The information processing apparatus according to claim 1, wherein
   the service chain information is configured to express the connection relationships among the components in a graph form, and
   the trained estimation model is configured to include a graph neural network.

3. The information processing apparatus according to claim 1, wherein
   the quality of service is determined based on at least any of delay time, execution time and a degree of having been normally processed about the application.

4. The information processing apparatus according to claim 1, wherein
   the workload information is configured to include at least any of a transaction volume, a volume of messages from users and a data transfer volume for the application.

5. The information processing apparatus according to claim 1, wherein
   the resource use information is configured to include at least any of an amount of use of a processor, an amount of use of a memory and an amount of use of a network bandwidth that are assigned to each of the components included in the application.

6. The information processing apparatus according to claim 1, wherein
   the predetermined optimization method is selected from between a steepest descent method and Bayesian optimization.

7. The information processing apparatus according to claim 1, wherein
   each of the components included in the application is executed on a container,
   the optimizing of the volume of the resources comprises:
   calculating an optimal volume of the resources; and
   calculating an optimal number of containers to execute the components from the calculated optimal volume of the resources, and
   the adjusting of the volume of the resources comprises adjusting the number of containers such that the number of containers to execute the components becomes the calculated optimal number.

8. An information processing method executed by a computer, the information processing method comprising:
   acquiring target data that includes workload information about an application constructed based on a microservice architecture and resource use information about resources used for each of components included in the application in an estimation target environment;
   calculating an estimated value of quality of service of the application based on the acquired target data by using a trained estimation model;
   if the calculated estimated value of the quality of service does not properly satisfy a target, optimizing a volume of the resources relative to the target, based on the estimated value of the quality of service calculated with the trained estimation model by a predetermined optimization method; and
   adjusting the volume of the resources used for each of the components according to a result of the optimization,
   wherein the target data further includes service chain information showing connection relationships among the components included in the application.

9. The information processing method according to claim 8, wherein
   the service chain information is configured to express the connection relationships among the components in a graph form, and
   the trained estimation model is configured to include a graph neural network.

10. The information processing method according to claim 8, wherein
    the quality of service is determined based on at least any of delay time, execution time and a degree of having been normally processed about the application.

11. The information processing method according to claim 8, wherein
    the predetermined optimization method is selected from between a steepest descent method and Bayesian optimization.

12. The information processing method according to claim 8, wherein
- each of the components included in the application is executed on a container,
- the optimizing of the volume of the resources comprises:
- calculating an optimal volume of the resources; and
- calculating an optimal number of containers to execute the components from the calculated optimal volume of the resources, and
- the adjusting of the volume of the resources comprises adjusting the number of containers such that the number of containers to execute the components becomes the calculated optimal number.

* * * * *